UNITED STATES PATENT OFFICE.

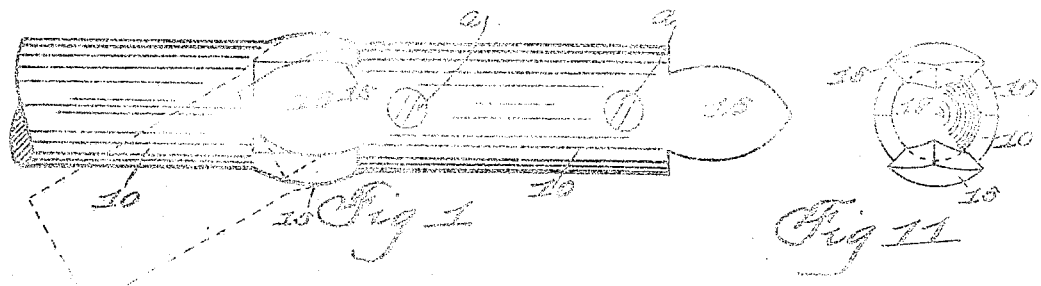
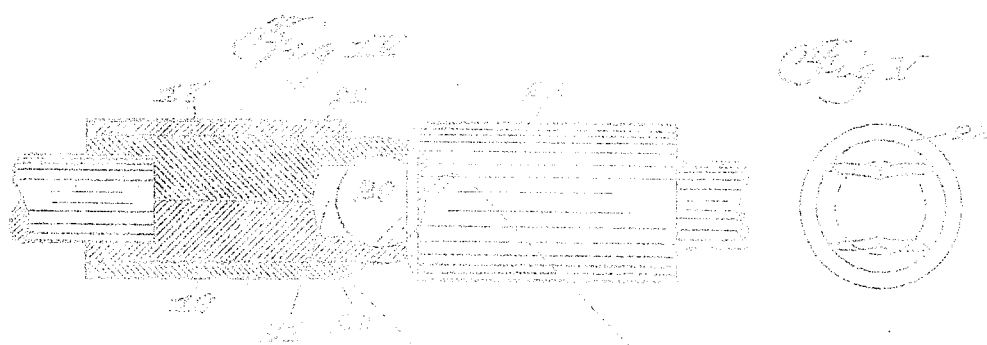

STEWART W. JAMESON, OF OSKALOOSA, IOWA.

FLEXIBLE COUPLING.

1,038,757.

Specification of Letters Patent. Patented Sept. 17, 1912.

Application filed June 1, 1909. Serial No. 499,520.

*To all whom it may concern:*

Be it known that I, STEWART W. JAMESON, a citizen of the United States, residing in Oskaloosa, county of Mahaska, and State of Iowa, have invented a new and useful Improvement in Flexible Couplings, of which the following is a specification.

The object of my invention is to provide a mechanical construction which can be applied to couplings for flexible shaft links and also, by a slight modification, be utilized as a universal joint. I am aware that flexible shaft couplings and universal joints somewhat similar in construction have been patented and used, but practically all of the same have exhibited defects and impractical points in their construction, and it is my principal object to provide a device of this character which will overcome all of such objections and will properly perform its functions.

Another object is to produce a device of this character which will be simple, strong, durable and practically inexpensive in construction and which will form a tight, but flexible, joint in which there will be no lost motion in the transmission of power.

My invention consists in certain details of construction, hereinafter set forth, pointed out in my claim, and illustrated in the accompanying drawings in which—

Figure I shows a side elevation view of the ends of two interlocking joints of my flexible shaft coupling; Fig. II shows an end view of one of my shaft points, with the ball in position therein; Fig. III is a side elevation of one of the sections or halves of the joint, showing the inner face thereof; Fig. IV shows the coupling I employ for my universal joint, a portion of the same being in section; and, Fig. V shows an end view of one of the shafts employed in my universal joint.

In constructing the joints for my flexible shafting, each of the same are constructed of two members which are exactly similar in every respect.

Referring to the accompanying drawings the reference numeral 10 is used to indicate one of the halves of the flexible joints I employ, the same being semi-cylindrical on its outer surface and flat on its inner surface. At each end thereof, and located on each side where the convexed surface joins the flat surface, are shoulders, 11—11 and 12—12 respectively, and the ends of the members are concaved at 13 and 14 respectively, from these shoulders, as shown in Fig. III. Projecting outwardly from each end of the member, with their inner extremities lying within and extending to the centers of their respective concaved recesses, are the partially spherical arms, 15 and 16 respectively, with their outer surfaces extending outside the plane of the outer surface of the member and their outer extremities curving gently inwardly. The inner surface of each of these arms is concaved, as shown, and the width of the arms is nearly equal to one quarter of a circle but tapers toward each end. Each member of each joint is provided with orifices which, when the halves are joined, are in line with each other for the purpose of receiving rivets $a$, or the like, which are designed to firmly secure them together.

The numeral 17 indicates a ball, designed to fit within the concaved surfaces of the arms, when the parts are joined and the couplings made.

In practical operation the halves of one joint are set at right angles to the halves of the other joint, the ball being grasped and held in position within the concaved surfaces of the arms. The concaved surfaces in the arms are so milled as to accurately fit the curve of the ball and to fit fairly flush against the ball when the parts are joined, only leaving sufficient play for free and easy movement of the joints on the ball. The recesses which project inwardly from the shoulders of the members of the joints are designed for the purpose of providing spaces into which the extremities of the arms may project when the coupling is bent. As the arms are practically of a size equal to one quarter of a circle, at their centers, it is obvious that there will be practically no lost motion in the transmission of power between the couplings.

In the modified form, illustrated in Figs. IV and V, in which my coupling used as a universal joint is shown, the arrangement is practically the same, except that I use sections, 18 and 19, instead of the members which form half of the joints of the shaft. These sections operate in pairs, two forming a cylinder which is provided with a socket at its inner extremity, designed to receive the end of a shaft. Each of the sections is provided with an outwardly projecting arm, partially spherical on its outer surface and concaved on its inner surface to fit the curve of a ball 20, and the extreme outer end of the arm is curved gently inwardly. Between the arms I have provided a recess 21 which extends inwardly beyond the surface of the ball 20, when the ball is in position after the parts are joined. The numeral 22 indicates a sleeve which is designed to fit over the sections and clamp them securely to the shaft, after the ball has been placed in position. This sleeve forms a shoulder between its outer end and the outer surface of the sections and this shoulder limits the degree to which the joint can be bent, as indicated by the dotted lines in Fig. IV which shows the two sleeves coming in contact. The outer ends of the arms on the sections are designed to protrude into the recess between the companion arms on the other shaft end when the joint is bent. In practical operation the sections and arms of the couplings forming the joint are set at right angles to each other, as shown, and the ball being placed between the arms the sleeves are driven to the desired positions, thus obviously clamping the parts together and firmly grasping the ball. As the four arms, each represent nearly one quarter of a circle at their central points, it is obvious that there will be practically no space between the sides of the arms thus overcoming the loss of motion in the transmission of power.

In the shaft coupling and the flexible joint the arms are so shaped, and concaved, as to firmly retain the ball when the parts are joined and it is not necessary to bend their outer ends inwardly. Thus it is obvious that these members, of which the arms are a part, may be drop forged. In this manner great strength can be, and is, given to the arms. As the arms are integral with, and a part of, the members from which they project it is obvious that additional strength is thereby gained.

Having thus described my invention what I claim and desire to secure by Letters Patent of the United States is:

A shaft coupling comprising in combination, a plurality of semi-cylindrical elements joined in pairs to form cylindrical lengths, an arm projecting from each extremity of said semi-cylindrical members, each of said arms having a portion of its outer face in alinement with the outer face of said semi-cylindrical member and its inner face recessed to form a socket, a ball secured between the projecting arms of the opposite semi-cylindrical members and in said sockets, and means for securing the semi-cylindrical members together.

STEWART W. JAMESON.

Witnesses:
MYRTLE BAWDEN,
JAS. D. HAWKINS.